(12) United States Patent
Yokoo et al.

(10) Patent No.: US 7,030,807 B2
(45) Date of Patent: Apr. 18, 2006

(54) RADAR DEVICE

(75) Inventors: Kaoru Yokoo, Kawasaki (JP); Yasuyuki Oishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/077,065

(22) Filed: Mar. 10, 2005

(65) Prior Publication Data

US 2005/0174281 A1    Aug. 11, 2005

Related U.S. Application Data

(63) Continuation of application No. PCT/JP03/05279, filed on Apr. 24, 2003.

(51) Int. Cl.
*G01S 13/10* (2006.01)
*G01S 13/93* (2006.01)

(52) U.S. Cl. ............ 342/135; 342/70; 342/118; 342/134; 342/175; 342/195; 701/300; 701/301

(58) Field of Classification Search ........ 701/300, 701/301; 180/167–169; 342/27, 28, 70–72, 342/118–147, 175, 192–197, 82–103; 356/4.01–5.15
See application file for complete search history.

(56) References Cited

U.S. PATENT DOCUMENTS

| 3,823,399 | A | * | 7/1974 | Yamanaka | 342/128 |
| 4,152,700 | A | * | 5/1979 | Bodnar | 342/135 |
| 4,770,526 | A | * | 9/1988 | Manhart et al. | 356/5.07 |
| 4,908,628 | A | * | 3/1990 | Cashen et al. | 342/134 |
| 5,621,766 | A |   | 4/1997 | Bakke et al. | |

FOREIGN PATENT DOCUMENTS

| EP | 0 709 975 | 5/1996 |
| JP | 58-205879 | 11/1983 |
| JP | 3-65678 | 3/1991 |
| JP | 5-223928 | 9/1993 |
| JP | 63-31733 | 12/1994 |
| JP | 7-280940 | 10/1995 |
| JP | 8-220214 | 8/1996 |
| JP | 9-27802 | 1/1997 |
| JP | 2002-221567 | 8/2002 |

OTHER PUBLICATIONS

International Search Report dated May 27, 2003.

* cited by examiner

*Primary Examiner*—Bernarr E. Gregory
(74) *Attorney, Agent, or Firm*—Katten Muchin Rosenman LLP

(57) ABSTRACT

The invention relates to a radar device for measuring a relative distance to a target. It is an object of the invention to precisely determine the relative distance to the target in a wide range. The radar device according to the invention generates a second pulse by demodulating a signal arriving from a target as a response to a wave signal modulated with a first pulse. The radar device evaluates, as the relative distance to the target, such two different instances that an absolute value of a deviation of a ratio of two instantaneous values of the second pulse from a reference value as a ratio of two instantaneous values of the first pulse is to be minimum. The respective two instantaneous values are with a predetermined interval therebetween on a time axis.

20 Claims, 6 Drawing Sheets

F I G. 2
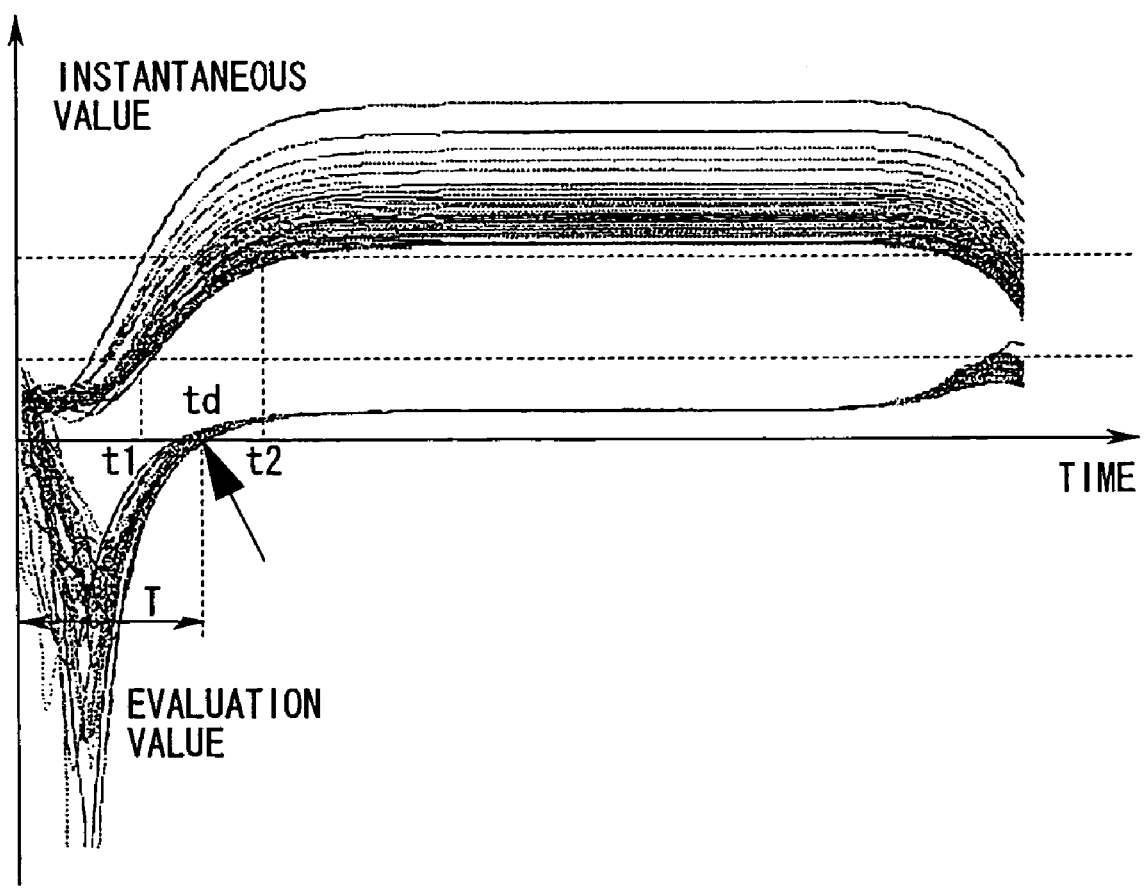

RADAR DEVICE

CROSS-REFERENCE TO RELATED APPLICATION

This application is a continuation application of International Application PCT/JP03/05279 filed Apr. 24, 2003, and designating the U.S. the contents of which are herein wholly incorporated by reference.

BACKGROUND OF THE INVENTION

1. Field of the Invention

The present invention relates to a radar device for measuring the relative distance to a target by processing a signal arriving from the target as a response to an irradiated wave signal.

2. Description of the Related Art

In recent years, with the application of highly advanced information processing technologies, image processing technologies, and signal processing technologies, enhancements in performance and value added of a radar device are achieved, and thus the radar device is applied to various fields.

Among these fields, for example, in a vehicle such as an automobile or the like, for the purpose of ensuring safety when traveling or driving, the radar device is utilized to detect a relative position to other vehicles or obstacles around the vehicle in the real time.

FIG. 6 is a diagram showing an example of a configuration of a conventional radar device.

In FIG. 6, an output port of a processor 41 is connected to a feeding point of an antenna 47T via a timing generating section 42, a pulse generating section 43, an amplifying section 44, a modulating section 45, and a band-pass filter 46 which are located in a cascade manner. The feeding point of the antenna 47R is connected to an input port of the processor 41 via an amplifying section 48, a band-pass filter 49, a demodulating section 50, a low-pass filter 51, an amplifying section 52, a matched filter 53, and a timing calculating section 54 which are located in a cascade manner. A synchronized output of the timing generating section 42 is connected to a corresponding input of the timing calculating section 54. To carrier-wave inputs of the modulating section 45 and the demodulating section 50, a corresponding output of a carrier-wave generating section 55 is connected.

In the radar device having such a configuration, the timing generating section 42 generates a clock signal indicating a period matched with a range in which a distance to a target is to be determined under the control of the processor 41. The pulse generating section 43 outputs a pulse signal having a predetermined pulse width in synchronization with the clock signal. The amplifying section 44 amplifies such a pulse signal and sets the amplitude of the pulse signal to a predetermined value. The modulating section 45 interrupts the carrier wave signal (here, for simplicity, it is assumed that the frequency is 76 MHz) generated by the carrier-wave generating section 55 according to the pulse signal having such an amplitude and generates a transmitted wave signal (here, for simplicity, it is assumed that the occupied bandwidth is 24 MHz). The band-pass filter 46 suppresses spurious components attached to the transmitted wave signal and emits a transmitted wave with such spurious components having been suppressed in a direction toward the target via the antenna 47T.

When the transmitted wave is reflected by the target or when it is emitted again, the antenna 47T catches a signal arriving from the target. The band-pass filter 49 extracts an occupied band component intrinsic to the signal among the components of the signal which is supplied amplified by the amplifying section 48. The demodulating section 50 is in cooperation with the low-pass filter 51 and the amplifying section 52 subsequent thereto and detects a signal distributed over such an occupied band based on the carrier wave normally generated by the carrier-wave generating section 55 as described above by means of homodyne detection, thereby forming a base band signal.

The matched filter 53 detects a correlation of a sequence of instantaneous values between the base band signal and the pulse signal having the predetermined pulse width which is generated by the pulse generating unit 43 as described above.

The timing calculating section 54 measures a length d of a period from the time at which the above-described period is determined by the timing generating section 42 up to the instance at which the result of the correlation has the maximum value.

The processor 41 performs an arithmetic operation represented by the following equation (1) based on the length d and a propagation velocity C of the above-described transmitted wave and the signal and determines the relative distance D to the target.

$$D = C \cdot d/2 \tag{1}$$

By the way, in such a conventional example, when components of a signal arriving from another target are included in the above-described base band signal, the relative distances to the respective targets cannot be determined with high precision.

Therefore, the pulse width W of the above-described pulse signal has to be set short drastically so that the relative distances to a plurality of adjacent targets are precisely identified.

However, the resolution $\Delta d$ of such a relative distance is generally given with the following equation (2) and, between the occupied bandwidth b and the pulse width W of the above-described pulse signal, the following equation (3) is established with respect to a constant K.

$$\Delta d = C \cdot W/2 \tag{2}$$

$$W \cdot b = K \tag{3}$$

Therefore, actually, if the bandwidth of the receiving system from the above-described antenna 47R to the output terminal of the amplifying section 52 is not set wide sufficiently, the resolution $\Delta d$ is hard to be raised.

Further, in some conventional radar devices, at the instance that the instantaneous value of the above-described base band signal exceeds a predetermined threshold, the signal generated when the above-described transmitted wave is reflected by the target or when it is emitted again is identified to have arrived.

In such radar devices, due to the difference between the rising time of the above-described amplifying sections 48 and 52 and the demodulating section 50 and filtering characteristics of the band-pass filter 49 and the low-pass filter 51, the change in rising time and filtering characteristic, and the wide-ranging change in level of a signal to be received, a steep waveform of the base band signal deteriorates. For this reason, it can be highly expected that a serious error occurs in relative distance to the target.

Further, the enlargement of the above-described occupied bandwidth b may be technically performed, but, with the finite radio frequency, it is limited legally. For this reason, the occupied bandwidth b is hard to be enlarged.

Reference 1

Japanese Unexamined Patent Application Publication No. Hei 8-220214 (Abstract and paragraph 0007)

Reference 2

Japanese Unexamined Patent Application Publication No. 2002-221567 (Abstract and claims 1 to 4, and 7)

Reference 3

Japanese Unexamined Patent Application Publication No. Hei 5-223928 (claim 1)

SUMMARY OF THE INVENTION

It is an object of the present invention to provide a radar device which can precisely determines a relative distance to a target in a wide range even if a bandwidth of a receiving system is narrow.

Further, it is another object of the present invention to precisely identify an instance at which a signal, which is a response to the wave signal, arrives from the target and to achieve measuring or positioning of the target stably and accurately.

Further, it is still another object of the present invention to increase responsibility or real-time requirement regarding the measuring or positioning of the target.

Further, it is a further object of the present invention, even if signals as an individual response from a plurality of targets having the substantially same relative distance arrive, to precisely achieve the measuring or positioning for the target from which the latest arrived signal is generated among the targets.

Further, it is a still further object of the present invention to achieve the measuring or positioning in a wide range precisely and stably.

Further, it is another object of the present invention to correct the change in performance or difference due to environmental conditions, time aging, and others.

Further, it is a further object of the present invention to correct the change in performance or difference due to environmental conditions, time aging, and others without complicating the configuration.

Further, it is a still further object of the present invention to flexibly adapt itself to various aspects such as maintenance or application.

Further, it is another object of the present invention to simplify the configuration and enhance responsibility without degrading precision.

Further, it is a further object of the present invention to flexibly adapt itself to the wide range, together with various characteristics, shapes, and proportional distribution of the targets.

Further, it is a still further object of the present invention to increase precision or accuracy regarding the measuring or positioning of the target.

Further, it is another object of the present invention to reduce limitations on cost or configuration regarding an enhancement in or insurance for precision of the measuring or positioning of the target.

Further, it is a further object of the present invention to increase precision regarding the measuring or positioning of the target.

Further, it is a still further object of the present invention to reduce collective running cost and to increase a margin for thermal design.

Further, it is another object of the present invention, even if the band of the signal arriving from the target is limited to the band narrower than the occupied band of the signal, to precisely determine the relative distance to the target in the wide range, in a ranging system, a positioning system, and a navigation system to which the present invention is applied.

In order to achieve the above-described objects, there is provided a radar device according to the present invention. In the radar device, a signal, which is a response to a wave signal modulated with a first pulse, arriving from a target is demodulated, and a second pulse is generated. Two different instances are specified at which the absolute value of the difference between a reference value which is the ratio between two instantaneous values of the first pulse at the instances separated by a predetermined interval on the time axis and the ratio between those of the second pulse at the times points becomes minimum. The relative distance to the target is evaluated as the difference between a reference instance on the time axis at which the wave signal is transmitted and one of the two difference instances or an instance near the two different instances.

In such a radar device, even if the amplitude of the second pulse is unknown and, under the band limitation performed when the second pulse is received, the waveform thereof is distorted, the ratio between the instantaneous values of the second pulse at the above-described interval has the value which does not almost depend on the amplitude.

Further, in order to achieve the above-described objects, there is provided the radar device in which both of the two different instances are set in a period of a leading edge of the second pulse.

In such a radar device, the relative distance to the target is promptly evaluated in the period of the leading edge of the signal as the response arriving first from the target.

Further, in order to achieve the above-described objects, there is provided the radar device in which both of the two different instances are set in a period of a trailing edge of the second pulse.

In such a radar device, the relative distance to the target is evaluated not in the period of the leading edge of the signal arriving first from the target, but in the period of the trailing edge subsequent to the period of the leading edge.

Further, in order to achieve the above-described objects, there is provided the radar device in which both of the two different instances are set in a period in which the receiving system linearly responds within a range of a value of the level of the signal.

In such a radar device, one of the two different instances which is evaluated as the relative distance to the target or the instance near the two different instances is precisely specified, irregardless of the level of the wave signal irradiated onto the target or the level of the signal arriving as the response of the target to the wave signal.

Further, in order to achieve the above-described objects, there is provided the radar device in which the reference value is specified based on a sequence of the instantaneous values of the second pulse generated by demodulating a reference signal input as an alternative of the signal.

In such a radar device, the reference value serving as a reference for identifying the instance at which the signal, which is the response to the above-described wave signal, arrives from the target is corrected based on the level, the waveform, the duty ratio, the modulation degree, and other predetermined values of the reference signal as the alternative of the signal.

Further, in order to achieve the above-described objects, there is provided the radar device in which the reference value is specified based on a sequence of the instantaneous values of the second pulse generated by demodulating the signal arriving from the target having the known relative distance.

In such a radar device, the reference value serving as a reference for identifying an instance at which the signal, which is the response to the above-described wave signal, arrives from the target is corrected based on the level, the waveform, the duty ratio, the modulation degree, and other predetermined values of the signal arriving from the target.

Further, in order to achieve the above-described objects, there is provided the radar device in which the reference value is specified based on a sequence of the instantaneous values of the first pulse.

In such a radar device, the reference value serving as a reference for identifying an instance at which the signal, which is the response to the above-described wave signal, arrives from the target is corrected based on the level, the waveform, the duty ratio, the modulation degree, and other predetermined values of the first pulse which is applied as a modulation signal when the wave signal to be irradiated onto the target is generated.

Further, in order to achieve the above-described objects, there is provided the radar device in which the reference value is determined or updated according to an instruction from an exterior.

In such a radar device, the reference value is properly updated with the momentum to be given at the time of maintenance or application.

Further, in order to achieve the above-described objects, there is provided the radar device in which the relative distance to the target is evaluated as the difference between the reference instance and one of the two different instances having the small absolute value of the difference.

In such a radar device, the instance at which the difference to the reference instance on the time axis is evaluated as the relative distance to the target is selected to one of the above-described two different instances.

Further, in order to achieve the above-described objects, there is provided the radar device in which the relative distance to the target is evaluated as the difference between the reference instance and a specified instance which is determined under the proportional distribution of the two different instances and whose difference is expected to be zero.

In such a radar device, even if the above-described interval is long, precision of the above-described relative distance is maintained high as long as the waveform of the second pulse is one on which the above-described proportional distribution is performed.

Further, in order to achieve the above-described objects, there is provided the radar device in which the specified instance is specified by means of the proportional distribution suitable for the sequence of the instantaneous values of the first pulse or the second pulse in a period interposed between the two different instances on the time axis.

In such a radar device, even if the waveform of the first pulse or the second pulse changes according to the range to be applied, the characteristic of the target, or others, the relative distance to the target is precisely evaluated.

Further, in order to achieve the above-described objects, there is provided the radar device in which the pulse width of the first pulse is set to a small value to an extent that a linear response is performed in a period including the two different instances and the wave signal modulated with the first pulse is transmitted.

In such a radar device, electric power of the wave signal to be irradiated onto the target is set to a value so as to prevent precision of the relative distance to the target from decreasing due to a nonlinear response of the receiving system.

Further, in order to achieve the above-described objects, there is provided the radar device in which the waveform of the first pulse is maintained to the one the instantaneous values of which monotonically increase or decrease with different gradients in the period including the two different instances.

In such a radar device, as long as the target acts as a reflector for reflecting the wave signal or an emitter for emitting the wave signal again, the difference to the reference value of the ratio between the instantaneous values of the second pulse at the above-described interval monotonically increases or decreases in the above-described period.

Further, in order to achieve the above-described objects, there is provided the radar device in which the waveform of the first pulse is maintained to the one having the change rate of the instantaneous values larger in the period including the two different instances than in other periods.

In such a radar device, as long as the target acts as the reflector for reflecting the wave signal or the emitter for emitting the wave signal again, the code of the difference to the reference value of the ratio between the instantaneous values of the second pulse at the above-described interval rapidly transits to another code in such a period.

Further, in order to achieve the above-described objects, there is provided the radar device in which the waveform of the first pulse is maintained to the one which allows all or some of a reduction in throughput, procedure simplification, and an enhancement in precision to be achieved regarding the proportional distribution process.

In such a radar device, as long as the target acts as the reflector for reflecting the wave signal or the emitter for emitting the wave signal again, the waveform of the first pulse is maintained to the above-described waveform, and thus the proportional distribution process is implemented with an aspect suitable for a desired configuration.

Further, in order to achieve the above-described objects, there is provided the radar device in which the waveform of the first pulse is maintained to the one which includes components such that distortion generated when the target responds to the wave signal is reduced or offset.

In such a radar device, the signal, which is the response to the wave signal, arriving from the target does not almost include the components of the distortion generated when the target responds to the wave signal.

Further, in order to achieve the above-described objects, there is provided the radar device in which the difference between the average of instances of one of the specified two different instances or instances near the specified two different instances and the reference instance is evaluated as the relative distance to the target.

In such a radar device, as long as the change in relative distance to the target is small to a tolerable extent, precision of the above-described difference increases as compared to the case in which the number of the instances of one of the above-described two different instances or the instances near the two different instances is single.

Further, in order to achieve the above-described objects, there is provided the radar device in which the instantaneous values of the second pulse and the ratio between the instantaneous values are referred to only in a period in which the two different instances are specified, in synchronization with the second pulse.

In such a radar device, in a period other than the above-described period, the process regarding the specification of the two different instances having the minimum absolute value of the difference to the reference value is omitted.

Further, in order to achieve the above-described objects, there is provided the radar device in which the instantaneous values of the second pulse and the ratio between the instantaneous values are referred to at a frequency smaller than the reciprocal of the predetermined interval in a period other than the period in which the two different instances are specified, in synchronization with the second pulse.

In such a radar device, in the period other than the above-described period, the frequency at which the process regarding the specification of the two different instances having the minimum absolute value of the difference to the reference value is performed by a signal specifying section is set to a small value.

The summary of the present invention is as follows.

In a first radar device according to the present invention, a receiving section demodulates a signal, which is a response to a wave signal modulated with a first pulse, arriving from a target and generates a second pulse. A signal specifying section specifies two different instances having a minimum absolute value of a difference between a reference value which is the ratio between instantaneous values of the first pulse at a predetermined interval on the time axis and the ratio between instantaneous values of the second pulse at the predetermined interval on the time axis. A distance evaluating section evaluates a relative distance to the target as a difference between a reference instance at which the wave signal is transmitted on the time axis and one of the specified two different instances or an instance near the specified two different instances.

Even if the amplitude of the second pulse is unknown and, under the band limitation to be performed by the receiving section, the waveform of the second pulse is distorted, the ratio between the instantaneous values of the second pulse at the above-described interval has the value which does not depend on the amplitude, as long as the change in relative distance to the target is negligibly small and the receiving section linearly responds to the wave signal.

Therefore, the instance at which the signal, which is the response to the above-described wave signal, arrives from the target is precisely identified as one of the above-described two different instances or the instance near the two different instances, and thus the measuring or positioning of the target is achieved stably and precisely.

In the second radar device according to the present invention, both of the two different instances are set in a period of a leading edge of the second pulse.

That is, the relative distance to the target is promptly evaluated in the period of the leading edge of the signal as the response arriving first from the target.

Therefore, with such a relative distance, responsibility or real-time requirement increases, as compared to the case in which both or one of the above-described two different instances is identified in a period subsequent to the leading edge of the second pulse.

In the third radar device according to the present invention, both of the two different instances are set in a period of a trailing edge of the second pulse.

That is, the relative distance to the target is evaluated not in the period of the leading edge of the signal as the response arriving first from the target, but in the period of the trailing edge subsequent to the period of the leading edge.

Therefore, even if the signals as the individual response from the plurality of targets having the substantially same relative distance arrive, the measuring or positioning for the target from which the latest arrived signal is generated among the targets is precisely achieved.

In the fourth radar device according to the present invention, both of the two different instances are set in a period in which a receiving system linearly responds within a range of a value of the level of the signal.

That is, one of the two different instances which is evaluated as the relative distance to the target by the distance evaluating section or the instance near the two different instances is precisely specified, regardless of the level of the wave signal irradiated onto the target or the level of the signal arriving as the response of the target to the wave signal.

Therefore, the measuring or positioning in the wide range is achieved precisely and stably.

In the fifth radar device according to the present invention, the signal specifying section specifies the reference value based on a sequence of the instantaneous values of the second pulse generated when a reference signal input as an alternative of the signal is demodulated by the receiving section.

That is, the reference value serving as the reference for identifying the instance at which the signal, which is the response to the above-described wave signal, arrives from the target is corrected based on the level, the waveform, the duty ratio, the modulation degree, and other predetermined values of the reference signal as the alternative of the signal.

Therefore, as long as such a reference signal is properly supplied, the change in performance or difference due to the environmental conditions, time aging, and others can be corrected.

In the sixth radar device according to the present invention, the signal specifying section specifies the reference value based on a sequence of the instantaneous values of the second pulse generated when the signal arriving from the target having a known relative distance is demodulated by the receiving section.

That is, the reference value serving as the reference for identifying the instance at which the signal, which is the response to the above-described wave signal, arrives from the target is corrected based on the level, the waveform, the duty ratio, the modulation degree, and other predetermined values of the signal arriving from the target.

Therefore, as long as the characteristics of a bidirectional wireless transmission line formed through the target and the characteristics of the target which performs the reflection, the re-emission, and other responses are known and proper, the change in performance or difference due to environmental conditions, time aging, and others can be corrected without complicating the configuration.

In the seventh radar device according to the present invention, the signal specifying section specifies the reference value based on a sequence of the instantaneous values of the first pulse.

The reference value serving as the reference for identifying the instance at which the signal, which is the response to the above-described wave signal, arrives from the target is corrected based on the level, the waveform, the duty ratio, the modulation degree, and other predetermined values of the first pulse which is applied as the modulation signal when the wave signal to be irradiated onto the target is generated.

Therefore, as long as the characteristics of the bidirectional wireless transmission line formed through the target are known and proper and the target acts as the reflector for reflecting the wave signal or the emitter for emitting the wave signal again, the change in performance or difference due to the environmental conditions, time aging, and others can be corrected without complicating the configuration.

In the eighth radar device according to the present invention, the signal specifying section determines or updates the reference value according to an instruction from an exterior.

That is, the reference value is properly updated with the momentum to be given at the time of maintenance or application.

Therefore, the present invention can be flexibly adapted to various aspects such as maintenance or application.

In the ninth radar device according to the present invention, the distance evaluating section evaluates the relative distance to the target as the difference between the reference instance and one of the two different instances which has a small absolute value of the difference.

That is, the instance at which the difference to the reference instance on the time axis is evaluated as the relative distance to the target is selected to one of the above-described two different instances.

Therefore, as compared to the case in which the above-described instance is determined based on the complex arithmetic operation, the configuration is simplified and responsibility is enhanced without degrading precision as the interval between the two different instances becomes short.

In the tenth radar device according to the present invention, the distance evaluating section evaluates the relative distance to the target as the difference between the reference instance and a specified instance which is determined under a proportional distribution of the two different instances and whose difference is expected to be zero.

That is, even if the above-described interval is long, precision of such a relative distance is maintained high as long as the waveform of the second pulse is the one on which the above-described proportional distribution is performed.

Therefore, the present invention can be flexibly adapted to the wide range, together with various characteristics, shapes, and proportional distribution of the targets.

In the eleventh radar device according to the present invention, the distance evaluating section specifies the specified instance by means of the proportional distribution suitable for the sequence of the instantaneous values of the first pulse or the second pulse in a period interposed between the two different instances on the time axis.

That is, even if the waveform of the first pulse or the second pulse changes according to the range to be applied, the characteristic of the target, or others, the relative distance to the target is precisely evaluated.

Therefore, the present invention can be flexibly adapted to the wide range, together with various characteristics, shapes, and proportional distribution of the targets.

In the twelfth radar device according to the present invention, a transmission section sets the pulse width of the first pulse to a small value to an extent that the receiving section linearly responds in a period including the two different instances, and transmits the wave signal modulated with the first pulse.

That is, electric power of the wave signal to be irradiated onto the target is set to the value so as to prevent precision of the relative distance to the target from decreasing due to the nonlinear response of the receiving system.

Therefore, the present invention can be flexibly adapted to the wide range.

In the thirteenth radar device according to the present invention, the transmission section maintains the waveform of the first pulse to the one the instantaneous values of which monotonically increase or decrease with different gradients in the period including the two different instances.

That is, as long as the target acts as the reflector for reflecting the wave signal or the emitter for emitting the wave signal again, the difference to the reference value of the ratio between the instantaneous values of the second pulse at the above-described interval monotonically increases or decreases in the above-described period.

Therefore, since redundancy of the instance having the minimum absolute value of the difference in such a period is excluded, precision and accuracy regarding the measuring or positioning of the target increases.

In the fourteenth radar device according to the present invention, the transmission section maintains the waveform of the first pulse to the one having a change rate of the instantaneous values larger in the period including the two different instances than in other periods.

That is, as long as the target acts as the reflector for reflecting the wave signal or the emitter for emitting the wave signal again, the code of the difference to the reference value of the ratio between the instantaneous values of the second pulse at the above-described interval rapidly transits to another code in such a period.

Therefore, precision regarding the measuring or positioning of the target increases.

In the fifteenth radar device according to the present invention, the transmission section maintains the waveform of the first pulse to the one which allows all or some of a reduction in throughput, procedure simplification, and an enhancement in precision to be achieved regarding a proportional distribution process in which an instance at which the difference to the reference instance is evaluated as the relative distance to the target is determined from the two different instances.

That is, as long as the target acts as the reflector for reflecting the wave signal or the emitter for emitting the wave signal again, the waveform of the first pulse is maintained to the above-described waveform, and thus the proportional distribution process is implemented with the aspect suitable for the desired configuration.

Therefore, the limitations on cost or configuration regarding an enhancement in or insurance for precision of the measuring or positioning of the target are reduced.

In the sixteenth radar device according to the present invention, the transmission section maintains the waveform of the first pulse to the one which includes components such that distortion generated when the target responds to the wave signal is reduced or offset.

That is, the signal, which is the response to the wave signal, arriving from the target hardly include the components of the distortion generated when the target responds to the wave signal.

Therefore, precision or accuracy regarding the measuring or positioning of the target increases.

In the seventeenth radar device according to the present invention, the distance evaluating section evaluates a difference between an average of instances of one of the specified two different instances or instances near the specified two different instances and the reference instance as the relative distance to the target.

As long as the change in relative distance to the target is small to the tolerable extent, precision of the above-described difference increases as compared to the case in which the number of the instances of one of the above-described two different instances or the instances near the two different instances is single.

Therefore, as long as the reduction in responsibility is permitted, precision regarding the measuring or positioning of the target increases.

In the eighteenth radar device according to the present invention, the signal specifying section, in synchronization with the second pulse, refers to the instantaneous values of the second pulse and the ratio between the instantaneous values only in a period in which the two different instances are specified.

That is, the signal specifying section omits the process regarding the specification of the two different instances having the minimum absolute value of the difference to the reference value in the period other than the above-described period.

Therefore, as compared to the case in which such a process is not omitted, collective running cost is reduced and the margin for thermal design increases.

In the nineteenth radar device according to the present invention, the signal specifying section, in synchronization with the second pulse, refers to the instantaneous values of the second pulse and the ratio between the instantaneous values at a frequency smaller than the reciprocal of the predetermined interval in a period other than the period in which the two different instances are specified.

That is, in the period other than the above-described period, the frequency at which the process regarding the specification of the two different instances having the minimum absolute value of the difference to the reference value is performed by a signal specifying section is set to a small value.

Therefore, as compared to the case in which the frequency of such a process is not changed, collective running cost is reduced and also the margin for thermal design increases.

In the twentieth radar device according to the present invention, a receiving section demodulates a signal, which is a response to a wave signal modulated a first pulse, arriving from a target and generates a second pulse. A signal specifying section specifies an instance at which correlation between a sequence of the ratio between instantaneous values of the second pulse a predetermined interval on the time axis and a characteristic quantity which is a sequence of the ratio between a plurality ($\geq 3$) of instantaneous values of the first pulse at the predetermined interval on the time axis is maximum. A distance evaluating section evaluates a relative distance to the target as a difference between a reference instance at which the wave signal is transmitted on the time axis and a specified instance or an instance near the specified instance.

That is, the instance at which the signal, which is the response to the above-described wave signal, arrives from the target is specified as the instance at which correlation between the sequence of the ratio of the plurality of instantaneous values of the signal and the above-described characteristic quantity is maximum, not the ratio of the single instantaneous value of the signal.

Therefore, even if the characteristic of a transmission line which is formed through the target and into which the wave signal is propagated, the measuring or positioning of the target is achieved stably and precisely.

BRIEF DESCRIPTION OF THE DRAWINGS

The nature, principle, and utility of the invention will become more apparent from the following detailed description when read in conjunction with the accompanying drawings in which like parts are designated by identical reference numbers, in which:

FIG. 2 is a diagram illustrating an operation of a first, second, fourth, fifth, or sixth embodiment of the present invention;

DESCRIPTION OF THE PREFERRED EMBODIMENTS

Hereinafter, embodiments of the present invention will be described in detail with reference to the drawings.

Figure 1:
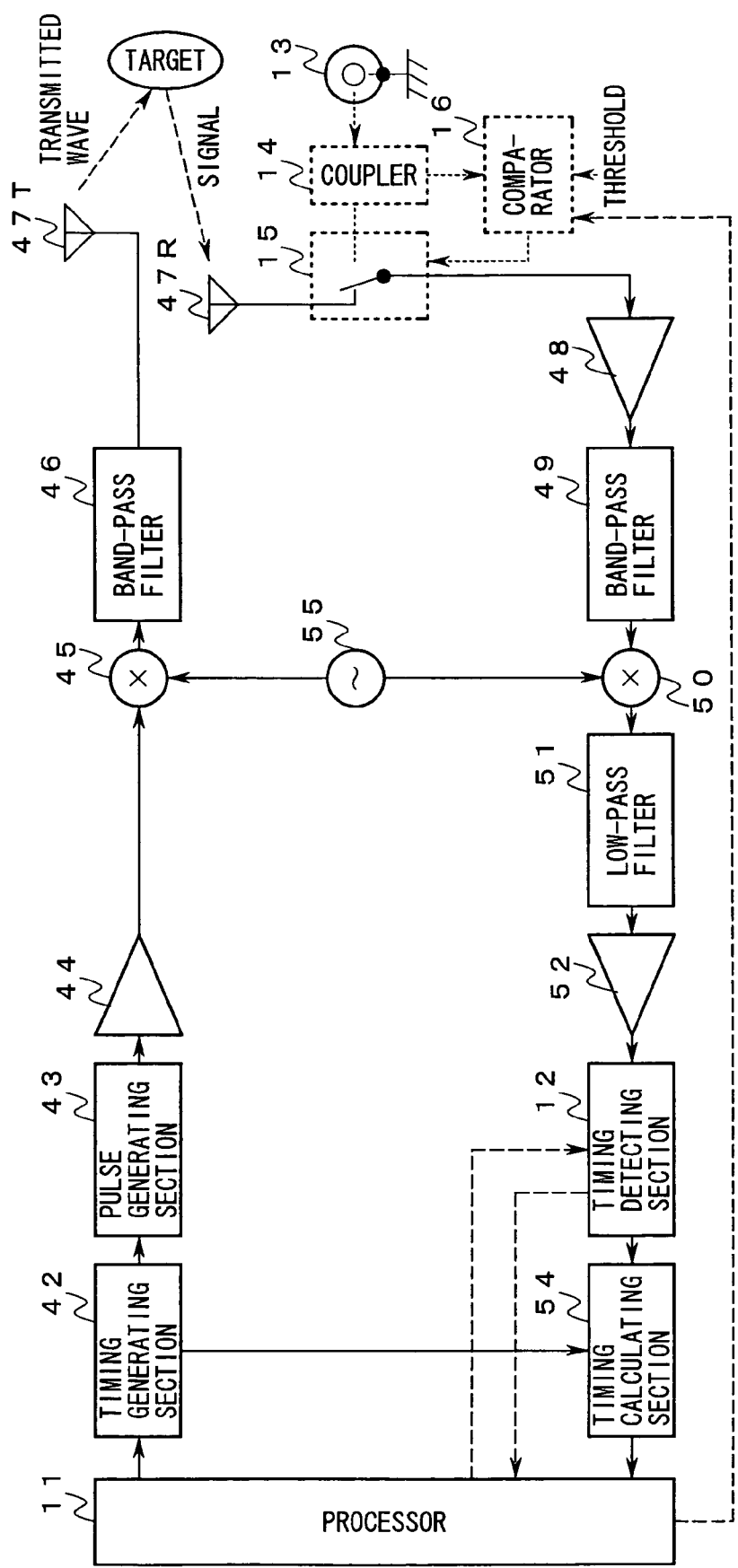
FIG. 1 is a diagram showing a first, second, or fourth embodiment of the present invention.

FIG. 1 is a diagram showing a first, second, fourth or fifth embodiment of the present invention.

Figure 6:
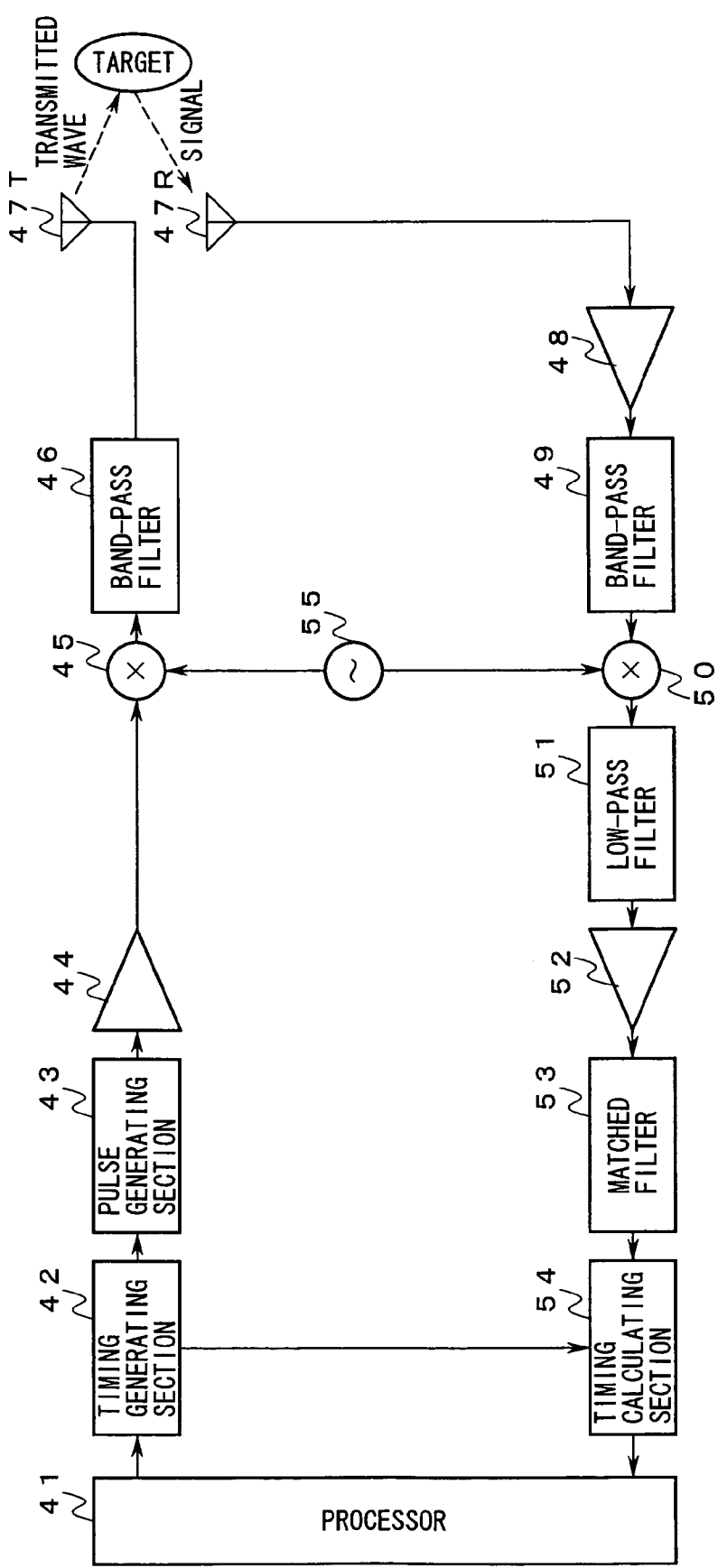
FIG. 6 is a diagram showing an example of a configuration of a conventional radar device.

In the present embodiments, instead of the processor 41 and the matched filter 53 shown in FIG. 6, a processor 11 and a timing detecting section 12 are provided respectively.

[First Embodiment]

FIG. 2 is a diagram illustrating an operation of the first embodiment of the present invention.

Hereinafter, the first embodiment of the present invention will be described with reference to FIGS. 1 and 2.

A timing generating section 42, a pulse generating section 43, an amplifying section 44, a modulating section 45, and a band-pass filter 46 emits a transmitted wave having small initial value and pulse width (duty ratio) to an extent that an amplifying section 48, a band-pass filter 49, a demodulating section 50, a low-pass filter 51, and an amplifying section 52 respond nonlinearly via an antenna 47T in a period (hereinafter, referred to as linear response period) that the above-described base band signal rises.

Further, an instance $\tau_0$ at which a pulse signal corresponding to the above-described pulse signal is to be detected from the base band signal generated under a homodyne detection of a signal arriving from a target according to such a transmitted wave is generally set in advance to the waveform of the pulse signal, the initial value and the pulse width (duty ratio) of the above-described transmitted wave, or the like.

The timing detecting section 12 sequentially samples an instantaneous value y of the base band signal in a constant period $\Delta$. Further, to the timing detecting section 12, at the above-described instance $\tau_0$ and an instance $(\tau_0+\Delta)$ subsequent to the instance $\tau_0$ after the time $\Delta$, a reference value Bref of a ratio of the instantaneous value of the pulse signal described above ($=y(\tau_0)/y(\tau_0+\Delta)$) is given as a previously known value. Moreover, as regards the reference value Bref, here, for simplicity, it is assumed that it is a value to allow a sufficient noise margin to be ensured in a predetermined environmental condition or range.

Further, under the above-described sampling process, the timing generating section 12 determines two instances t separated by $\Delta$ on the time axis in an order of time series and the ratio B(t) (=y(t)/y(t+Δ)) between a pair of instantaneous values y(t) and y(t+Δ) sampled with (t++Δ), and performs the following processes.

(1) Determine an evaluation value E(t) represented by the following equation (4) to the ratio B(t) and the above-described reference value Bref.

$$E(t)=B(t)-\text{Bref} \quad (4)$$

(2) Search a pair of instances t1 and t2 (=t1+Δ) having a minimum absolute value of the evaluation value E(t) and calculates the time td directly and exclusively determined to the instances t1 and t2 (this may be expected or calculated by distributing the pair of instances t1 and t2).

A timing calculating section 54 measures a length T of a period from the instance determined in the predetermined period by the timing generating section 42 to the time td calculated in such a manner.

By the way, when the instantaneous value of the pulse signal to be detected in the linear response period is given to the time t with a time function f(t), even if the amplitude of the pulse is an unknown quantity A, the above-described ratio B(t) (=y(t)/y(t+Δ)) is the value which does not depend on the unknown quantity A, as represented by the following equation (5).

$$B(t) = y(t)/y(t+\Delta) \quad (5)$$
$$= A \cdot f(t)/A \cdot f(t+\Delta)$$
$$= f(t)/f(t+\Delta)$$

Further, as regards the time function f(t), when the transmitted wave is generated when a carrier wave signal is suffered from on/off keying with a rectangular pulse signal or when the pulse signal included in the base band signal appears to be a rectangular wave since a collective gain in a portion from an output terminal of the amplifying section 48 to an output terminal of the amplifying section 52 becomes large, it can appears to be a response to a step function of a time constant circuit having a time constant equal to a collective time constant τ of the portion, as represented by the following equation (6).

$$f(t)=1-e^{-t/\tau} \quad (6)$$

Therefore, according to the present embodiment, even if the above-described amplitude A is the unknown quantity, the amplitude and the pulse width or the duty ratio of the transmitted wave changes in a wide range, and distortion occurs under nonlinearity or band limitation of both or one of a receiving system and a transmitting system, as long as the reference value Bref is precisely specified (this may be actually measured or calculated when the time function f(t) is expected or specified), the rising edge of the signal arriving from the target is identified based on the above-described evaluation value E(t), as shown in an arrow of FIG. 2, and thus measuring or positioning of the target is implemented precisely and stably.

Further, in the present embodiment, since the bandwidth into which noise is distributed is reduced by permitting the above-described band limitation, a collective SN increases, and thus the measuring or positioning is enhanced.

Moreover, in the present embodiment, the two instances which give the above-described reference value Bref are set in the period in which the above-described base band signal rises.

However, the present invention is not limited to this configuration. For example, the instances may be set in a period in which the above-described base band signal falls.

Further, in the present embodiment, the instantaneous value $y(\tau_0)$ to which the reference value Bref is given may be quantitatively calculated in advance based on the level of the transmitted value having the previously known value, a rough calculation value of the relative distance to the target, a propagation loss to the target (including a loss due to reflection or re-emission by the target).

Further, in the present embodiment, the time td may be calculated as the time which is determined directly and exclusively by means of the proportional distribution or the like of the pair of instances t1 and t2.

However, even with a change in the characteristic of the transmission line through which the transmitted wave or the reflected wave propagates, the time td may be precisely calculated as such an instance that correlation between a sequence of the ratio of the instantaneous values y obtained in an order of time series and a characteristic quantity made of a sequence of an ideal value of the ratio is to be maximum.

[Second Embodiment]

Hereinafter, the second embodiment will be described.

In the present embodiment, as shown in a dotted line of FIG. 1, specified output and input of a timing detecting section 12 are connected to corresponding ports of the processor 11 respectively. Further the following elements are provided:

A coaxial connector 13;

A coupler 14 whose input is connected to the coaxial connector 13;

A switch 15 having a make contact connected to an output of the coupler 14, a common contact connected to an input of the amplifying section 48, and a break contact connected to a feeding point of the antenna 47R; and A comparator 16 which is connected to the other output of the coupler 14 and a control input of the switch 15 and to which a threshold described later is given in advance.

Hereinafter, the operation of the second embodiment will be described with reference to FIG. 1.

The comparator 15 maintains the connection of the common contact and the break contact of the switch 15 when a signal is not input via the coaxial connector 13 and the coupler 14 from an exterior or in a period in which the level of the signal is less than the above-described threshold.

Therefore, in such a period, the respective stages after the amplifying section 48 operate as in the above-described first embodiment.

Further, the processor 11 starts a process which realizes the resetting of the above-described reference value Bref (hereinafter, referred to as reference value setting process) according to an instruction which is given via an operation display section or a communication link (not shown).

On the other hand, the comparator 16 receives a signal as an alternative of the signal arriving from the target (hereinafter, referred to as reference signal) via the coaxial connector 13 and the coupler 14 and connects the common contact of the switch 15 to the make contact, not the break contact of the switch 15, in a period in which the average of the level of the reference signal (or initial value) exceeds the above-described threshold.

Therefore, in such a period, the amplifying section 48 is normally supplied with the above-described reference signal.

Under the above-described sampling process, the timing detecting section 12 determines two instances t separated by Δ on the time axis in an order of time series and the ratio B'(t) (=y'(t)/y'(t+Δ)) between a pair of instantaneous values y'(t) and y'(t+Δ) of the reference signal at (t+Δ) and supplies the sequence of the ratio B'(t) to the processor 11.

During the above-described reference value setting process, the processor 11 updates the reference value Bref to the width or duty ratio of the pulse signal, the level of the transmitted wave, other proper values in a corresponding range (for example, the average of the ratio B'(t) in a period in which the value of the above-described ratio B'(t) monotonically increases or decreases).

The timing detecting section 12 performs the same processes as those in the above-described first embodiment based on the reference value Bref updated in such a manner.

As such, according to the present embodiment, the reference value Bref is set freely and broadly according to the reference signal which is input via the coaxial connector 13 from the exterior.

Therefore, it is possible to flexibly adapt to the measuring or positioning in various ranges or fields. Further, in addition to operation efficiency regarding maintenance and application, value added increases.

[Third Embodiment]

Figure 3:
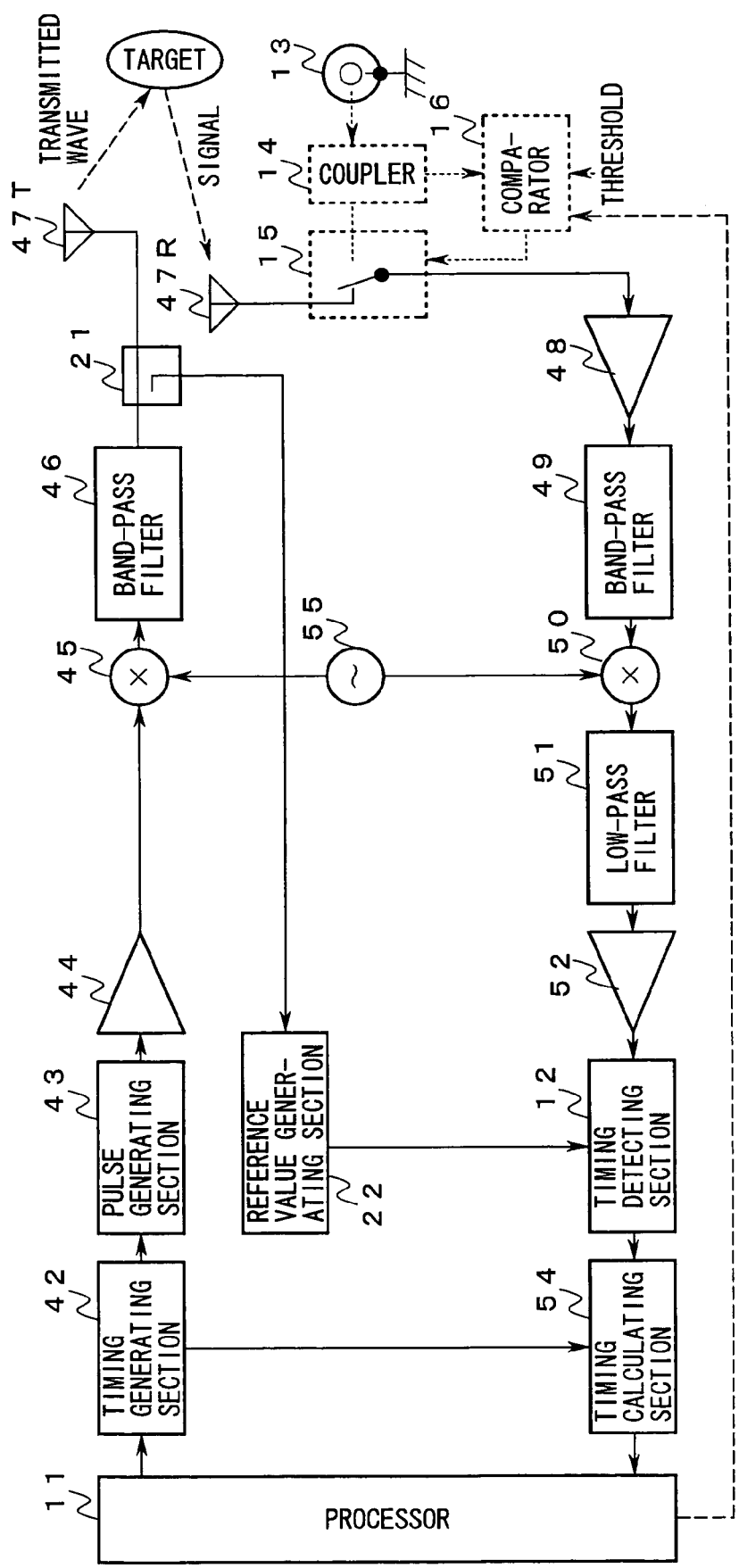
FIG. 3 is a diagram showing a third embodiment of the present invention.

FIG. 3 is a diagram showing a third embodiment of the present invention.

In the present embodiment, as shown in FIG. 3, the following elements are provided:

A directional coupler 21 appended to a feeding line of the antenna 47T; and

A reference value generating section 22 which is connected in series to one terminal connected to an auxiliary line provided in the directional coupler 21 and whose output is connected to a corresponding input of the timing detecting section 12.

Hereinafter, the operation of the third embodiment will be described with reference to FIG. 3.

The directional coupler 21 extracts components of the transmitted wave which is fed to the antenna 47T.

The reference value generating section 22 demodulates the components, on behalf of the demodulating section 50, to generate the base band signal and samples the instantaneous values of the base band signal in the period Δ to calculate the ratio B'(t) (=y'(t)/y'(t+Δ)) between the instantaneous values y'(t) and y'(t+Δ).

Further, the reference value generating section 22 performs the above-described reference value setting process while referring to the sequence of the ratio B'(t), on behalf of the processor 11 to update the reference value Bref.

Therefore, according to the present embodiment, as long as the transmitted wave is normally generated and is supplied to the antenna 47T, even if a signal source generating the above-described reference signal is not connected, the reference value Bref is properly updated at the time of the update of the range or other phenomenon or momentum.

[Fourth Embodiment]

Hereinafter, a fourth embodiment of the present invention will be described.

The present embodiment has the same configuration as that of the first embodiment, except that the coupler 14, the switch 15, and the comparator 16 shown in FIG. 1 are not provided.

Hereinafter, the operation of the fourth embodiment of the present invention will be described with reference to FIG. 1.

The present embodiment has a feature of a procedure of the following process which is performed by the processor 11.

The processor 11 starts the above-described reference value setting process at the time of the update of the range or other phenomenon or momentum.

Further, during such a reference value setting process, the processor 11 refers to the ratio B'(t) (=y'(t)/y'(t+Δ)) which is calculated by the timing detecting section 12 just after the start of the reference value setting process and supplied, and updates the reference value Bref to the width or duty ratio of the pulse signal, the level of the transmitted wave, other proper values in a corresponding range (for example, the average of the ratio B'(t) in a period in which the value of the above-described ratio B'(t) monotonically increases or decreases).

Therefore, according to the present embodiment, as long as the signal arriving from the target just after the start of the reference value setting process is a proper and known one, even if the signal source generating the above-described reference signal is not connected, the reference value Bref is properly updated.

[Fifth Embodiment]

Figure 4A:
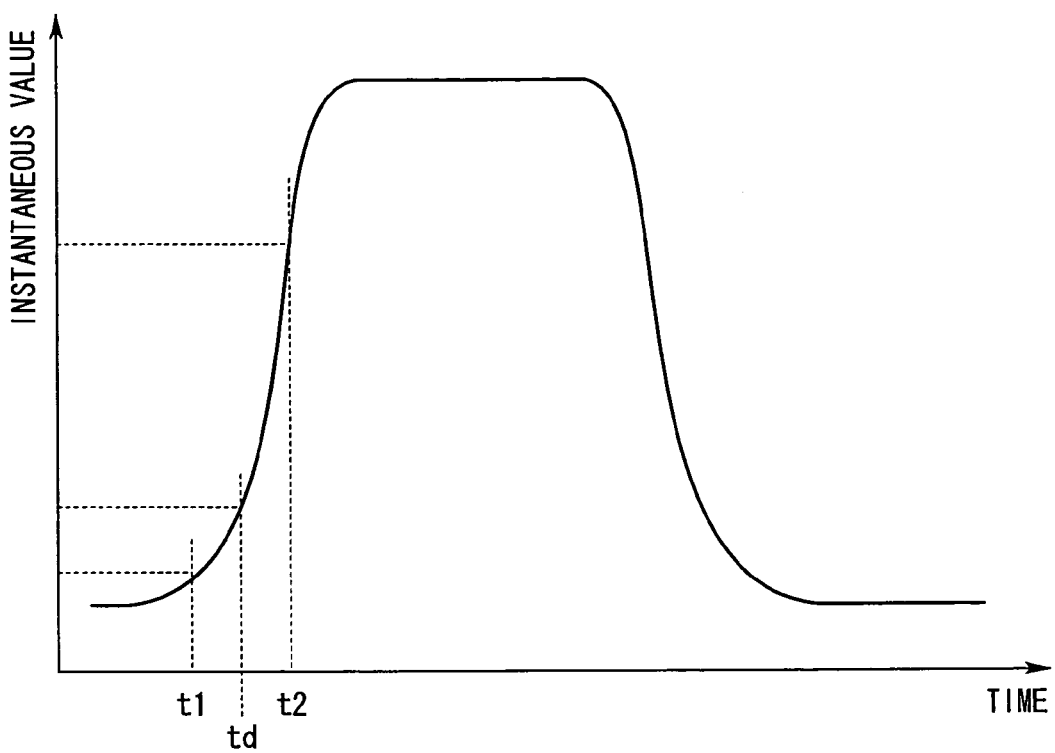
FIGS. 4a and 4b are diagrams illustrating the fifth embodiment of the present invention.
Figure 4B:
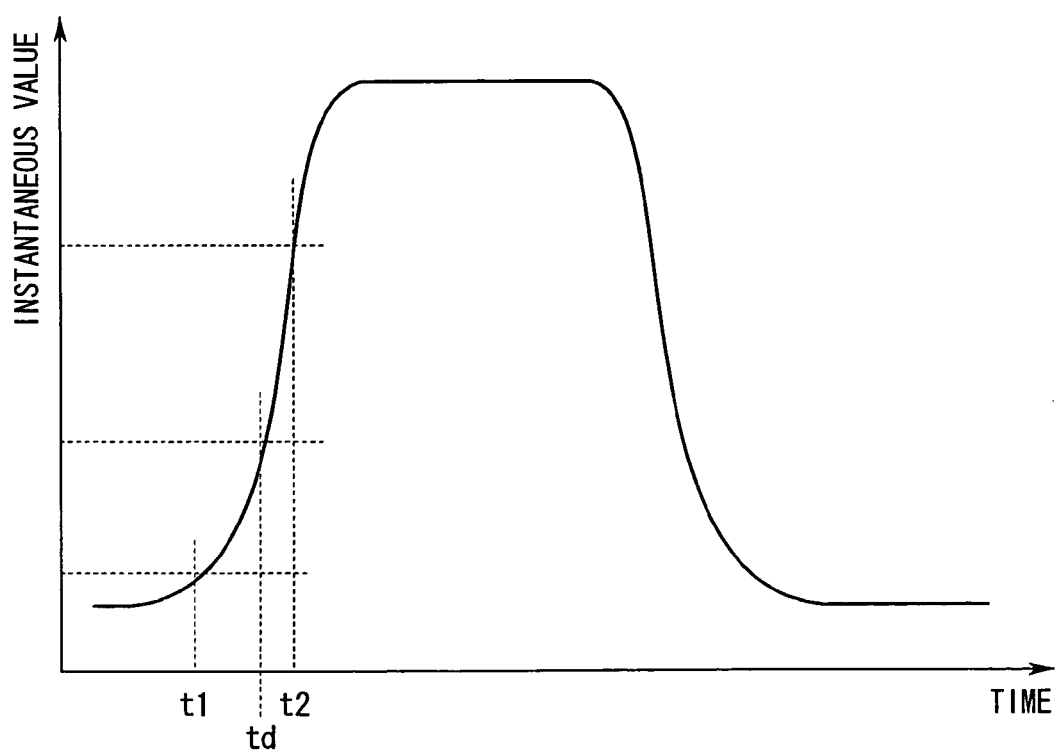

FIGS. 4A and 4B are diagrams illustrating the operation of a fifth embodiment of the present invention.

Hereinafter, the operation of the fifth embodiment of the present invention will be described with reference to FIGS. 1, 4A, and 4B.

The present embodiment has a feature of a procedure of the following process that the processor 11 performs in cooperation with the timing detecting section 12.

The processor 11 supplies the reference value Bref suitable for the range to be applied and other requests to the timing detecting section 12.

Similarly to the above-described first embodiment, the timing detecting section 12 searches a pair of instances t1 and t2 (=t1+Δ) based on the reference value Bref and calculates the time td based on the instances t1 and t2 in the following forms:

As shown in FIG. 4A, a central point td (=(t1+t2)/2) of the instances t1 and t2 on the time axis; and As shown in FIG. 4B, in a period corresponding to the period from the instance t1 to the instance t2, the instance td which is obtained by distributing the instances t1 and t2 in a form that the difference to a linear arrangement representing the instantaneous values of the pulse signal generated by the pulse generating section 43 is maintained to a minimum.

That is, the instance td is specified as the instance at which the evaluation value E(t) precisely has a small value, as compared to the case in which the instance td is simply set in the instance t1.

Therefore, according to the present embodiment, the waveform of the pulse signal, the duty ratio, the period, other requirements are not specifically shown.

However, as regards these requirements, as long as the pair of instances t1 and t2 are surely specified and the instance td is precisely specified based on the instances t1 and t2, any requirements may be used. In particular, when precision of the measuring or positioning is needed to be increased or simplification of the process or an enhancement in real-time requirement is demanded, for example, the pulse signal having the following waveforms may be used.

(1) A waveform whose instantaneous value monotonically increases or decreases in a period including the pair of instances t1 and t2 or in a period between the instances t1 and t2.

(2) A waveform the change rate of the instantaneous value of which is larger in such a period than in other periods.

(3) A waveform in which components overlap in advance during the reflection or re-emission to the target such that the distortion caused by the reflection or re-emission is reduced or offset (4) A waveform suitable for the proportional distribution process in which the instance td is calculated.

Further, in the above-described embodiments, the above-described instance td is calculated based on the pair of instances t1 and t2 and the instance td is converted into the distance or position.

However, the present invention is not limited to this configuration. For example, a smoothing process (a moving average method, an exponential smoothing method, and other algorithms may be applied) in any of the following forms may be executed such that precision of the measuring or positioning is increased.

(1) The pair of instances t1 and t2 are repetitively calculated in an order of time series and the instance td is calculated based on two instances which are specified as the respective average of the instances t1 and t2.

(2) The instance td to be converted into the distance or position of the target is calculated as the average of the instance td calculated in an order of time series.

Further, in the above-described embodiments, the timing detecting section 12 samples the instantaneous values y of the base band signal in the constant period Δ.

However, the present invention is not limited to this configuration. For example, when power consumption or the throughput of the timing detecting section 12 is needed to be reduced, the above-described process in the following forms may be performed by the timing detecting section 12.

(1) The period in which the pair of instances t1 and t2 are specified is specified based on the sequence of the instantaneous values of the base band signal and the above-described process is performed only in the period.

(2) In a period other than such a period, the frequency at which the above-described process is performed is set to be low.

Further, in the above-described embodiments, the present invention is applied to the radar device which emits an electric wave as the above-described transmitted wave.

However, as long as the bidirectional transmission line suitable for the measuring or positioning is formed through the target which is an object of measuring or positioning, such a transmitted wave may be a wave signal such as an optical signal (laser beam), ultrasonic, or the like.

Further, in the above-described embodiments, the present invention is applied to the radar device which realizes the measuring or positioning.

However, the present invention is not limited to such a radar device. For example, the present invention may be applied to the radar which is used for various fields such as monitoring, navigation, atmospheric phenomenon, or the like.

Further, in the above-described embodiments, the present invention is applied to the primary radar.

However, the present invention is not limited to the primary radar, but it may be the secondary radar.

Further, in the above-described embodiments, a process to a signal arriving from a noise source or the target with an excessive level is not performed.

Figure 5:
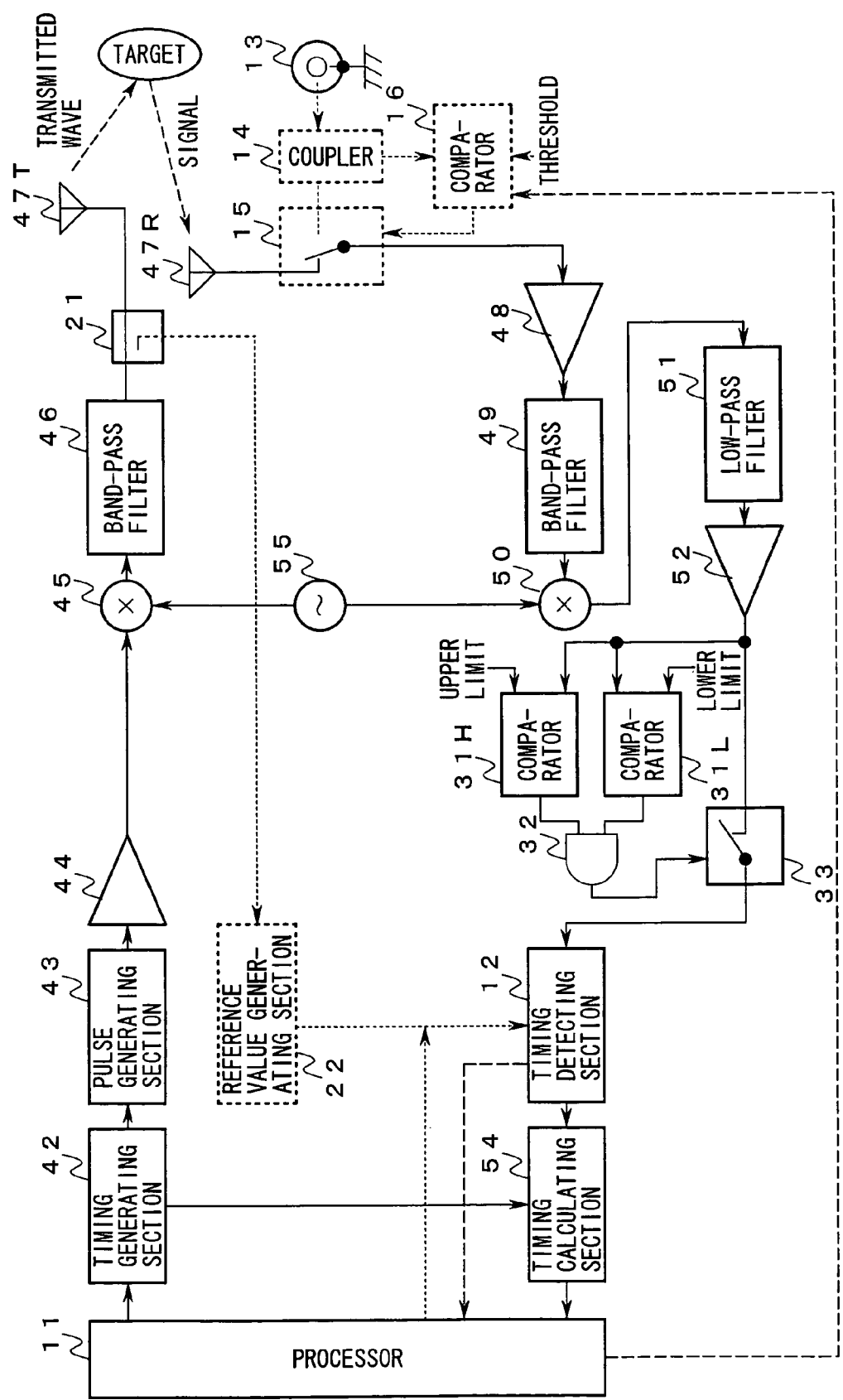
FIG. 5 is a diagram showing another embodiment of the present invention.

However, when the above-described process is likely to be not performed normally due to the excessive level of the signal, for example, as shown in FIG. 5, between a stage of a comparator 31H and 31L and an AND gate 32 which discriminates dimensional relation between the instantaneous values of the base band signal and predetermined upper and lower limits and a stage of the amplifying section 52 and the timing detecting section 12, a switch 33 for interrupting the base band signal according to the binary signal indicating dimensional relationship may be arranged Further, The comparator 31H and 31L, the AND gate 32, and the switch 33 may be substituted with the following elements:

A clipper for clipping the waveform of the base band signal; and

A slicer for limiting the minimum and maximum of the instantaneous value of the base band signal.

The invention is not limited to the above embodiments and various modifications may be made without departing from the spirit and scope of the invention. Any improvement may be made in part or all of the components.

What is claimed is:

1. A radar device comprising:
   a receiving section demodulating a signal which arrives from a target as a response to a wave signal modulated with a first pulse signal, to generate a second pulse signal;
   a signal specifying section specifying such two different instances that an absolute value of a deviation of a ratio of two instantaneous values of the second pulse signal from a reference value as a ratio of two instantaneous values of the first pulse signal is to be minimum, the two instantaneous values of the first and second pulse signals being with a predetermined interval therebetween on a time axis; and
   a distance evaluating section evaluating a relative distance to the target as a difference between a reference instance and one of specified two different instances or an instance near the specified two different instances, the reference instance being an instance at which the wave signal is transmitted on the time axis.

2. The radar device according to claim 1, wherein both of the two different instances are set to be in a period of a leading edge of the second pulse signal.

3. The radar device according to claim 1, wherein both of the two different instances are set to be in a period of a trailing edge of the second pulse signal.

4. The radar device according to claim 1, wherein both of the two different instances are set to be in a period which are within a range of values of a level of the signal and in which a receiving section linearly responds.

5. The radar device according to claim 1, wherein the signal specifying section specifies the reference value based on a sequence of the instantaneous values of the second pulse signal generated when a reference signal input as an alternative of the signal is demodulated by the receiving section.

6. The radar device according to claim 5, wherein the signal specifying section determines or updates the reference value according to an instruction from an exterior.

7. The radar device according to claim 1, wherein the signal specifying section specifies the reference value based on a sequence of the instantaneous values of the second pulse signal generated when the signal arriving from the target having a known relative distance is demodulated by the receiving section.

8. The radar device according to claim 1, wherein the signal specifying section specifies the reference value based on a sequence of the instantaneous values of the first pulse signal.

9. The radar device according to claim 1, wherein
the distance evaluating section evaluates the relative distance to the target as a difference between the reference instance and one of the two different instances which has a small absolute value of the difference.

10. The radar device according to claim 1, wherein
the distance evaluating section evaluates the relative distance to the target as a difference between the reference instance and a specified instance which is determined under a proportional distribution of the two different instances and whose difference is expected to be zero.

11. The radar device according to claim 10, wherein
the distance evaluating section specifies the specified instance by means of a proportional distribution suitable for a sequence of the instantaneous values of the first pulse signal or the second pulse signal in a period interposed between the two different instances on the time axis.

12. The radar device according to claim 1, further comprising:
a transmission section setting a pulse width of the first pulse signal to a small value to an extent that the receiving section linearly responds in a period including the two different instances, and transmitting the wave signal modulated with the first pulse signal.

13. The radar device according to claim 12, wherein
the transmission section maintains a waveform of the first pulse signal at such a waveform that the instantaneous values monotonically increase or decrease with different gradients in the period including the two different instances.

14. The radar device according to claim 12, wherein
the transmission section maintains a waveform of the first pulse signal at such a waveform that a change rate of the instantaneous values in the period including the two different instances is to be larger than in other periods.

15. The radar device according to claim 12, wherein
the transmission section maintains a waveform of the first pulse signal at such a waveform as to achieve all or part of a reduction in throughput, procedure simplification, and an enhancement in precision regarding a proportional distribution processing in which an instance is determined from the two different instances and the difference between the instance and the reference instance is evaluated as the relative distance to the target.

16. The radar device according to claim 12, wherein
the transmission section maintains a waveform of the first pulse signal at a waveform which includes such components that a distortion generated when the target responds to the wave signal is reduced or offset.

17. The radar device according to claim 1, wherein
the distance evaluating section determines an average of instances of one of the specified two different instances or instances near the specified two different instances and evaluates the difference between the average and the reference instance as the relative distance to the target.

18. The radar device according to claim 1, wherein
in synchronization with the second pulse signal, the signal specifying section refers to the instantaneous values of the second pulse signal and the ratio between the instantaneous values only in a period in which the two different instances are specified.

19. The radar device according to claim 1, wherein
in synchronization with the second pulse signal, the signal specifying section refers to the instantaneous values of the second pulse signal and the ratio between the instantaneous values at a frequency smaller than a reciprocal of the predetermined interval in a period other than the period in which the two different instances are specified.

20. A radar device comprising:
a receiving section demodulating a signal which arrives from a target as a response to a wave signal modulated with a first pulse signal, to generate a second pulse signal;
a signal specifying section specifying such an instance that a correlation between a sequence of ratios of instantaneous values of the second pulse signal and a characteristic quantity is to be maximum, the characteristic quantity being a sequence of ratios of three or more instantaneous values of the first pulse signal, the instantaneous values of the first and second pulse signals being with a predetermined interval therebetween on a time axis; and
a distance evaluating section evaluating a relative distance to the target as a difference between a reference instance and a specified instance or an instance near the specified instance, the reference instance being an instance at which the wave signal is transmitted on the time axis.

* * * * *